UNITED STATES PATENT OFFICE.

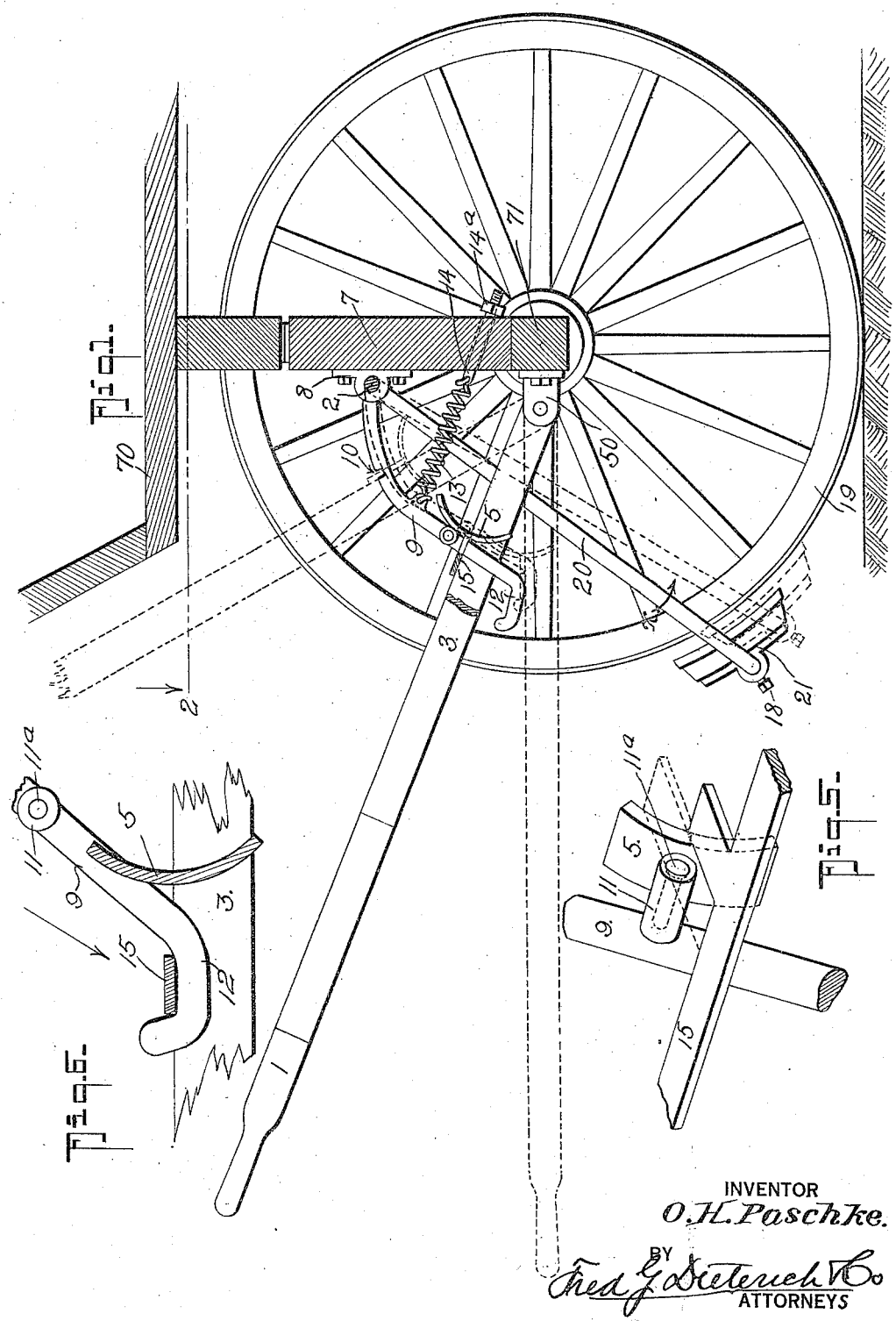

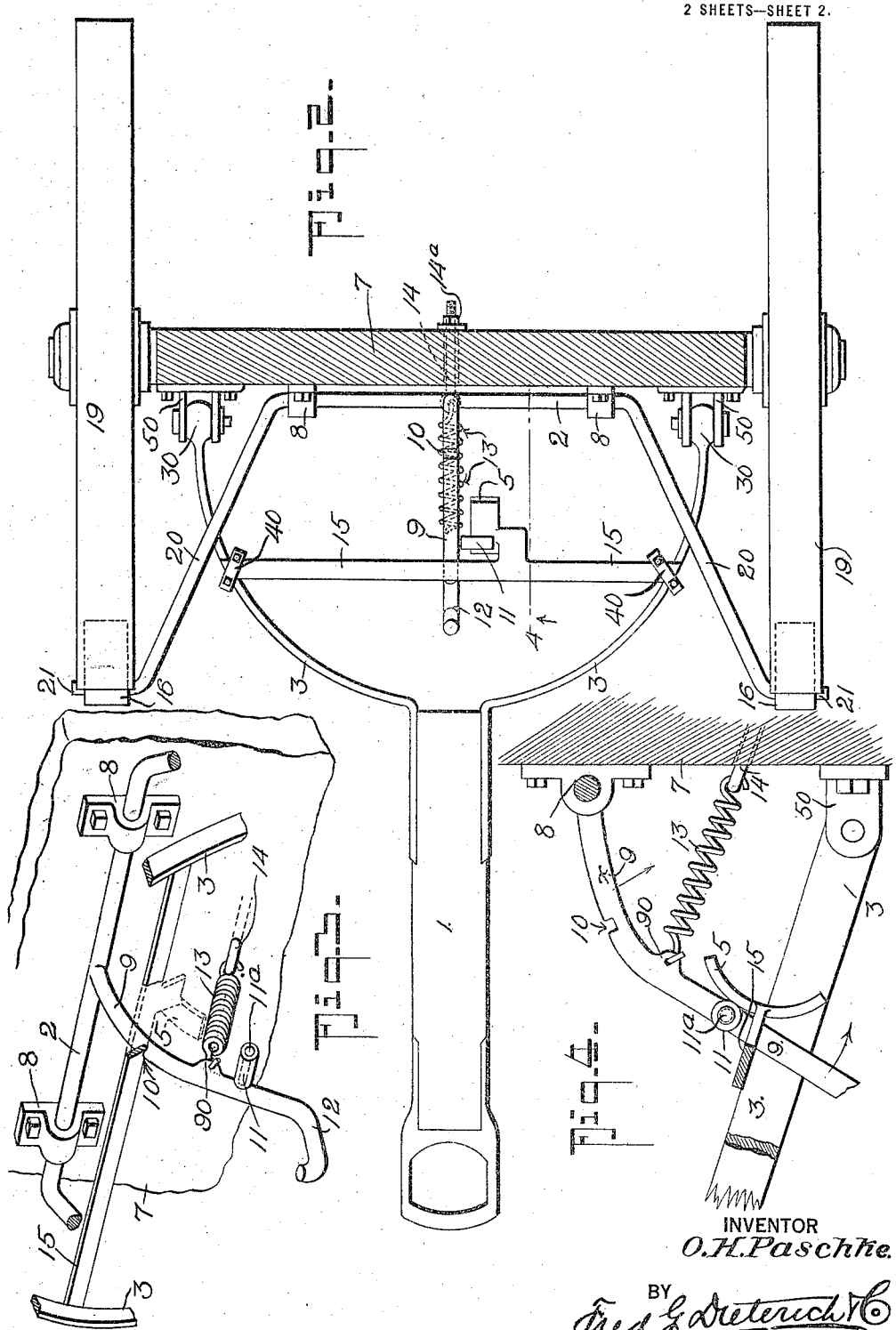

OTTO H. PASCHKE, OF YAKIMA, WASHINGTON, ASSIGNOR TO AUTOMATIC TRUCK BRAKE CO., A CORPORATION OF WASHINGTON.

SAFETY TRUCK-BRAKE.

1,301,311.      Specification of Letters Patent.      Patented Apr. 22, 1919.

Application filed October 7, 1918. Serial No. 257,278.

*To all whom it may concern:*

Be it known that I, OTTO H. PASCHKE, a citizen of the United States, residing at Yakima, in the county of Yakima and State of Washington, have invented a new and Improved Safety Truck-Brake, of which the following is a specification.

My invention has reference to improvements in brake mechanisms that are more especially designed for use in connection with manually drawn hand trucks, and primarily my said invention has for its purpose to provide a simple and economical construction of brake devices, of comparatively few parts, and which automatically operate for applying or releasing the brake shoes under certain manipulations of the pulling or guiding tongue, which in my construction of brake mechanism, constitutes a brake controlling lever or handle.

Another object of my invention is to provide an improved construction of brake devices that may be readily applied to and adapted for being adjustably combined with any of the ordinary types of hand trucks, such as baggage, or express trucks, which devices serve to hold the truck for safety, when jarred by a passing train, heavy winds, &c., while resting on the train platform.

Another feature of my invention is embodied in the provision of a brake mechanism for trucks of the general type stated, that is very handy in stopping heavy loads, as the truck, either in the backing or forward motion, is advancing along a decline and for holding the truck steady and from motion while loading and unloading, &c.

With other objects in view, that will hereinafter appear, my invention embodies certain details of construction and novel combinations of parts, all of which will be first explained, specifically pointed out in the appended claims and illustrated in the accompanying drawings, in which:

Figure 1 is a side elevation, parts being in section, of my construction of brake mechanism for trucks, so much of a baggage truck being shown as is necessary to illustrate a practical application of my invention; the tongue or handle being in the pulling position, the brake devices shown at the released position in full lines, and the said tongue or handle being shown at the down or drop position and the brake devices applied, in dotted lines, the tongue being further shown in dotted lines at its elevated or rest position.

Fig. 2 is a plan view of the parts shown in full lines in Fig. 1.

Fig. 3 is a detail perspective view of coöperating portions of the rock shaft with the brake arm and the curved guide with the tongue rest and the tongue, the latter being shown lifted with its cross member in locked engagement with the said aforesaid curved guide.

Fig. 4 is a detail cross section of the parts shown in Fig. 3, taken on the line 4—4 on Fig. 2, the tongue being at the pulling or backing position.

Fig. 5 is a detail perspective view that illustrates the specific construction of the cam guide on the cross bar of the tongue yoke and the roller bearing on the guide that holds the said guide out under tension of the pull back spring, when the brake shoes are at the outer or released position.

Fig. 6 is a detail cross section that illustrates the cross bar of the tongue or lever as dropped down or seated on the rest or hook end of the curved guide, the roller bearing on the guide being shown as disengaged from the cam guide.

In the drawings, in which like numerals indicate like parts in all of the figures, 7 designates the sand board, 70 a portion of the truck body, 71 the front axle and 19—19 the front truck wheels that are mounted on the axle in the usual manner.

My improved brake mechanism includes a yoke frame that has opposite side arms 20—20 and a cross member 2, the latter being rockably mounted in bearing boxes 8—8 secured to the front of the sand board 7, as is best shown in Figs. 2 and 3, by reference to which it will be also observed that a centrally disposed and outwardly and downwardly curved guide lever arm 9 is fixed to and rocks in the vertical plane with the member 2 in the manner and for the purpose presently explained.

The side arms 20—20 of the yoke frame extend in a divergingly forward direction and the lower end of each of such arms terminates in an outwardly extended crank-like member 21 and the said members project across the wheels 19—19.

16—16 designate brake shoes and they are adjustably secured, one upon each of the members 21—21 of the shiftable brake or yoke frame, by the set screws 18—18, as shown.

1 designates the tongue, which in my construction of brake mechanism, operates as a pull lever and as a lever handle for shifting the brake yoke frame to the applied or released positions.

The tongue 1 includes a substantially semi-circular metal yoke frame 3 connected by a cross bar 15 and the ends of the said yoke frame 3 terminate in clip heads 30 for pivotally joining the clip brackets 50—50 bolted to the front axle, see Figs. 1 and 2.

9 designates a curved guide arm, the lower or free end of which terminates in a substantially horizontally outwardly extended hook portion 12. The said arm 9 about midway of its length has an apertured boss 90 and near its upper end, in the top edge thereof, it has a lock notch 10, the purpose of which will presently appear.

13 indicates a stout coil pull spring, one end of which connects with the apertured boss 90 on the arm 9 and the other end is joined to an eye bolt 14 that projects through a passage in the sand board and whose free end is threaded for receiving an adjusting nut 14$^a$.

By connecting the pull spring 13 with the arm 9, as stated and shown, the normal tension of the spring tends to rock the truck frame in the direction indicated by the arrows $x$ and to move the said truck frame and the brake shoes to the applied position shown in dotted lines on Fig. 1.

In my construction of brake mechanism, the truck frame and the shoes are positively held to their released position to allow for the free rotation of the front truck wheels, when the combined tongue and lever 1 is held to the operative or pulling and backing position, as shown in full lines on Fig. 1.

For holding the said brake devices at the released position stated, the cross bar 15 of the tongue frame is provided with a curved cam shoe 5 that is preferably shaped up from and constitutes an integral part of the bar, as shown in detail Fig. 5.

By reference to Figs. 5 and 1, it will be noticed a stud pin 11$^a$ projects laterally from the arm 9 and carries a roller bearing 11, the latter, when the tongue lever 1 is lifted to the pulling or backing position, indicated in full lines on Fig. 1, is engaged by the cam shoe 5 and thereby causes the yoke-shaped brake frame with the shoes 16—16 to swing out to the full line position in the said Fig. 1 and with the said brake shoes 16—16 released from engagement with the front wheels.

During the aforesaid movement of the tongue lever 1 and the arm 9, additional tension is applied to the pull spring 13.

The cross bar 15 in practice is preferably secured to the tongue yoke frame 3 by clamps 40—40, as shown.

The manner of operation and the advantages of my invention will be readily understood by referring more particularly to Fig. 1. When the tongue 1 is at the full line position, the truck may be readily drawn forwardly or back and turned in either direction, since the brake devices are now held to the released position shown by the said full lines.

When the tongue is lowered or dropped, its cross bar 15 engages and seats on the hook end 12 of the arm 9 and the roller bearing 11 being now moved out of engagement with the cam shoe 5, the tension of the spring 13, plus the weight of the tongue 1, rocks the arm 9 inwardly in the direction of the arrow $x$ and at the same time swings the brake frame to the dotted line position and thereby applies the brake shoes 16—16 to the wheels 19—19.

When the truck is in use, the tongue is swung up to the dotted position shown in Fig. 1 and in so doing the shoe 5 passes up from under the roller bearing 11 and owing to the peculiar curve of the arm 9, the cross bar 15 engages the said arm 9 and sufficiently flexes or swings it so that the said cross bar interlocks with the notch 10; the tongue 1, when thus held, relieves the spring 13 and serves to hold the brake frame and the brake shoes to the applied position.

While the tongue 1, when at the elevated position, tends to relieve the spring 13 and affects the desired rocking of the brake frame to move it to the brake applied position, when the said tongue is dropped or lowered, it engages the hook portion 12 and assists the spring 13 in making a dead lock of the shoes 16—16 against the truck wheels, it being understood that, when the handle is not hooked in either the up or down position but so held that the shoe 5 and the bearing roller 11 are disengaged, the spring does the required work for holding the brake applied.

By combining the guide arm 9, the spring 13 and the cross bar 15 of the brake frame in the manner shown and described provides, as it were, a dependent and an independent way for applying the brakes, or in other words, should the spring 13 become inactive, the drop and the elevated adjustments of the tongue 1 may in themselves be utilized for effecting the desired rocking of the brake frame for applying and holding the brake shoes to their locked position.

While the details of construction shown and described present a preferred and practical arrangement of my invention, it is to be understood that I do not limit myself to the exact details and combination of the parts shown and described, since they may be readily modified or varied without departing from the spirit of my invention and as comes within the scope of the appended claims.

What I claim is:

1. A brake mechanism for trucks that comprises, in combination with a wheeled axle, a brake frame hingedly mounted on the truck and including brake shoes arranged for contacting with the wheels, a tongue-like handle pivotally connected to the said axle independent of the brake frame to swing in the vertical plane and means coöperating with the handle and the brake frame automatically actuated by the predetermined lift or drop movements of the handle for moving the hingedly mounted brake frame into the applied position.

2. In a brake mechanism of the character described, the combination with the truck frame, which includes a wheeled axle and a pull handle pivotally connected to the axle to swing in the vertical plane; of a brake frame hingedly mounted on the truck body and including forwardly projected pendent side arms and a brake shoe mounted on each of the said side arms to project over their respective wheel tires, means tending to normally swing the brake frame to the applied position and other means on the pull handle for holding the brake frame against movement to its applied position, when the pull handle is in the truck pulling or pushing position.

3. In a brake mechanism of the character described, the combination with the truck frame which includes a wheeled axle and a pull handle pivotally connected to the axle to swing in the vertical plane; of a brake frame hingedly mounted on the truck body and including forwardly projected pendent side arms and a brake shoe mounted on each of the said side arms to project over their respective wheel tires, means tending to normally swing the brake frame to the applied position, and other means on the pull handle for holding the brake frame against movement to its applied position, when the pull handle is in the truck pulling or pushing position, the said last named means comprising a crank arm projected from the hinged brake frame having a bearing member and a cam shoe on the pull handle that engages with the said bearing member while the said handle is at the pulling or pushing position.

4. In a brake mechanism of the character described, the combination with the truck frame which includes a wheeled axle and a pull handle pivotally connected to the axle to swing in the vertical plane; of a brake frame hingedly mounted on the truck body and including forwardly projected pendent side arms and a brake shoe mounted on each of the said side arms to project over their respective wheel tires, means tending to normally swing the brake frame to the applied position, and other means on the pull handle for holding the brake frame against movement to its applied position, when the pull handle is in the truck pulling or pushing position, the said last named means comprising a crank arm projected from the hinged brake frame having a bearing member and a cam shoe on the pull handle that engages with the said bearing member while the said handle is at the pulling or pushing position, the said cam shoe and the bearing member having such relation, whereby the cam shoe is disengaged from the said bearing member, when the handle is lifted or lowered away from the pulling or pushing position, whereby to permit the brake frame being swung to the brake applying position.

5. In a brake mechanism, the combination with a pivoted brake shoe carrying member, a lever connected with the same, a swinging tongue, a device carried by the tongue and engaged with the lever for applying and releasing the brake according as the tongue is in one position or another, and means on the lever for arresting the tongue, when the same is at its lowermost position, and further means for effecting engagement between the tongue and the lever to apply the brake and hold the tongue at an elevated position.

6. In a brake mechanism, the combination with a pivoted brake shoe carrying member, a lever connected with the same, a swinging tongue, a device carried by the tongue and engaged with the lever for applying and releasing the brake according as the tongue is in one position or another, and means on the lever for arresting the tongue, when the same is at its lowermost position, and further means for effecting engagement between the tongue and the lever to apply the brake and hold the tongue at an elevated position, and means on the lever for arresting the tongue, when the same is at its lowermost position.

OTTO H. PASCHKE.

Copies of this patent may be obtained for five cents each, by addressing the "Commissioner of Patents, Washington, D. C."